US008225710B2

(12) United States Patent
De Graaff et al.

(10) Patent No.: US 8,225,710 B2
(45) Date of Patent: Jul. 24, 2012

(54) BEVERAGE PREPARATION SYSTEM, HOLDER AND APPARATUS

(75) Inventors: Gerbrand Kristiaan De Graaff, Lisse (NL); Hendrik Cornelis Koeling, Amersfoort (NL); Ka Cheung Tsang, Amsterdam (NL); Ralf Kamerbeek, Utrecht (NL)

(73) Assignee: Koninklijke Douwe Egberts B.V. (NL)

( * ) Notice: Subject to any disclaimer, the term of this patent is extended or adjusted under 35 U.S.C. 154(b) by 716 days.

(21) Appl. No.: 12/226,399

(22) PCT Filed: Apr. 19, 2007

(86) PCT No.: PCT/NL2007/050169
§ 371 (c)(1), (2), (4) Date: Jan. 14, 2009

(87) PCT Pub. No.: WO2007/120052
PCT Pub. Date: Oct. 25, 2007

(65) Prior Publication Data
US 2009/0314167 A1    Dec. 24, 2009

(30) Foreign Application Priority Data

Apr. 19, 2006  (NL) .................................... 1031622
Jun. 29, 2006  (NL) .................................... 1032087

(51) Int. Cl.
*A47J 31/41* (2006.01)
(52) U.S. Cl. ............ 99/295; 99/323; 206/0.5; 206/222; 206/219; 426/78; 426/79; 426/115
(58) Field of Classification Search ............. 99/295, 99/323; 239/310, 316, 317; 206/0.5, 222, 206/219; 426/78, 79, 115
See application file for complete search history.

(56) References Cited

U.S. PATENT DOCUMENTS

| 5,615,801 | A  |   | 4/1997  | Schroeder et al. |
| 5,842,645 | A  | * | 12/1998 | Degongre et al. ............. 239/312 |
| 6,419,166 | B1 | * | 7/2002  | Brzezinski et al. ........... 239/310 |
| 6,698,333 | B2 | * | 3/2004  | Halliday et al. ................ 99/295 |
| 7,640,843 | B2 | * | 1/2010  | Halliday et al. ................ 99/295 |

(Continued)

FOREIGN PATENT DOCUMENTS

EP    1 462 042 B1    9/2004

(Continued)

OTHER PUBLICATIONS

U.S. Appl. No. 12/297,619, filed Oct. 17, 2008, De Graaff et al.

(Continued)

*Primary Examiner* — Reginald L Alexander
(74) *Attorney, Agent, or Firm* — Foley & Lardner LLP

(57) ABSTRACT

A system for preparing a predetermined amount of beverage suitable for consumption, provided with an exchangeable holder (102), and an apparatus provided with a fluid dispensing device which is detachably connected to the holder for dispensing a first fluid under pressure to a first mixing chamber (110) of the exchangeable holder. The exchangeable holder is provided with a storage space (108) which is filled with a second fluid and a fluid communication (114) between the storage space and the first mixing chamber for dispensing the second fluid to the first mixing chamber. The holder further comprises a fluid communication seal (138) for bringing the fluid communication into operation through removal of the sealing action of the fluid communication. The fluid communication is a channel having a first curvature (171) in longitudinal direction of the channel.

41 Claims, 7 Drawing Sheets

U.S. PATENT DOCUMENTS

| | | | |
|---|---|---|---|
| 7,650,830 B1 * | 1/2010 | Lessis | 99/279 |
| 7,878,108 B2 * | 2/2011 | Mock et al. | 99/295 |
| 2004/0055948 A1 * | 3/2004 | Blum et al. | 210/435 |

FOREIGN PATENT DOCUMENTS

| | | |
|---|---|---|
| NL | 7215523 | 5/1974 |
| WO | WO 01/21292 A1 | 3/2001 |
| WO | WO 02/074143 A2 | 9/2002 |
| WO | WO 2005/019093 A3 | 3/2005 |
| WO | WO 2005/063093 A1 | 7/2005 |
| WO | WO 2005/070816 A1 | 8/2005 |
| WO | WO 2006/005401 A3 | 1/2006 |
| WO | WO 2007/120045 A2 | 10/2007 |
| WO | WO 2007/120046 A2 | 10/2007 |
| WO | WO 2007/120047 A2 | 10/2007 |
| WO | WO 2007/120048 A2 | 10/2007 |
| WO | WO 2007/120049 A2 | 10/2007 |
| WO | WO 2007/120050 A2 | 10/2007 |
| WO | WO 2007/120051 A2 | 10/2007 |

OTHER PUBLICATIONS

U.S. Appl. No. 12/297,629, filed Oct. 17, 2008, Koeling et al.
U.S. Appl. No. 12/226,401, filed Oct. 17, 2008, De Graaff et al.
U.S. Appl. No. 12/297,623, filed Oct. 17, 2008, De Graaff et al.
U.S. Appl. No. 12/297,631, filed Oct. 17, 2008, De Graaff et al.
U.S. Appl. No. 12/297,625, filed Oct. 17, 2008, De Graaff et al.
U.S. Appl. No. 12/297,618, filed Oct. 17, 2008, De Graaff et al.
International Search Report for International Application No. PCT/NL2007/050169; mailing date Nov. 27, 2007; 5 pages.

* cited by examiner

BEVERAGE PREPARATION SYSTEM, HOLDER AND APPARATUS

CROSS-REFERENCE TO RELATED APPLICATIONS

The present application is a national phase application of International Application No. PCT/NL2007/050169 filed on Apr. 19, 2007 titled "BEVERAGE PREPARATION SYSTEM, HOLDER AND APPARATUS", which claims priority to Netherlands Application No. NL 1031622, filed on Apr. 19, 2006, and Netherlands Application No. NL 1032087, filed on Jun. 29, 2006, the full disclosures of all three are hereby incorporated herein by reference.

BACKGROUND

The invention relates to a system according to the preamble of claim 1. The invention also relates to an exchangeable holder for use in such a system. The invention further relates to an apparatus for use in such a system.

Such a system is known from WO 2006/043808.

As the exchangeable holder may be an exchangeable holder which, after being used once for preparing a predetermined amount of beverage suitable for consumption, such as a cup of coffee, is removed from the system by a user and ends up in the waste circuit, it is of importance that the holder can be manufactured so as to be compact and in an inexpensive manner. It is also of importance that the supply of the second fluid in a dosed manner from the storage space to the first mixing chamber is reliable.

SUMMARY

An object of the invention is to provide a solution according to which a holder for use in such a system can be manufactured so as to be compact and in an inexpensive manner, while the supply of the second fluid in a dosed manner from the storage space to the first mixing chamber is reliable.

To this end, according to the invention, a system of the initially indicated type is characterized in that the fluid communication is a channel having a first curvature in longitudinal direction of the channel.

As the fluid communication is a channel having a first curvature in longitudinal direction of the channel, the channel offers the second fluid flowing therethrough a sufficiently great resistance for obtaining a reliable dosing upon supply of the second fluid from the storage space to the first mixing chamber. Furthermore, the use of the first curvature contributes to the realization of a greater channel length and, hence, greater resistance, without compromising the compact shape of the holder. If, for instance, for reasons of compactness, the storage space and the first mixing chamber are located closely together in the holder, with respect to a sufficiently great resistance, through the use of the first curvature, still, a channel with sufficient length can be realized.

It is noted that within the framework of the present invention, a "curvature" of a channel also comprises a (very) local curvature formed in the longitudinal direction of the channel, such as, for instance, an angle (that may be right or not right).

In one embodiment, the system is further provided with at least one fluid communication seal for bringing the fluid communication into operation through removal of the sealing action of the fluid communication seal, while the fluid communication seal is preferably formed by a locally weakened part of a sealing attachment between parts of the holder.

A fluid communication seal which is formed by a locally weakened part of a sealing attachment between parts of the holder is compact. Furthermore, in the manufacturing process, the locally weakened part of the holder can be realized in a simple manner by, for instance, locally reducing the heating temperature and/or the compression pressure and/or locally utilizing a coating, wax or the like between the two materials when sealingly attaching two materials of the holder through heating and compressing.

The sealing action of the fluid communication seal can be removed in that, for instance, the second fluid in the storage space removes the sealing action of the fluid communication seal with great pressure. This offers the advantage that the user needs not carry out operations for removing the sealing action.

If the removal of the sealing action of the fluid communication seal is carried out in that, for instance, the second fluid in the storage space removes the sealing action of the fluid communication seal with great pressure, as a result of this great pressure, the great resistance of the channel prevents the second fluid from being supplied too rapidly from the storage space to the first mixing chamber. The great resistance of the channel is not only determined by a great length of the channel but is also, in itself, already determined by the presence of the first curvature.

According to a preferred embodiment, the holder comprises a blister pack which is provided with: blister chambers; a covering of the blister chambers, the storage space and/or the first mixing chamber and/or the fluid communication between the storage space and the first mixing chamber each being formed by one of the blister chambers; and the fluid communication seal, while the first curvature occurs in a plane parallel to the covering. Such a blister pack can be inexpensively mass-produced and is compact.

According to a further preferred embodiment of the above-mentioned preferred embodiment, the locally weakened part of the sealing attachment is used between, on the one side, material from which the blister chambers have been deep-drawn and, on the other side, material of the covering of the blister chambers. Such a seal, also called "peel seal", is a compact solution that can be manufactured inexpensively for bringing the fluid communication into operation through removal of the sealing action of the peal seal.

According to a different preferred embodiment, the channel has a second curvature in the longitudinal direction mentioned, which second curvature is the opposite of the first curvature, so that the channel has an S-shaped portion. The second curvature contributes to a further extent to the above-mentioned effects that are also achieved with the first curvature, i.e., contributing to an increased flow resistance of the channel. In addition, with the aid of the second curvature, the fluid communication can be designed such that a favourable inflow of the second fluid into the first mixing chamber is realized.

Also, according to the invention, an exchangeable holder according to claim 4, and an apparatus according to claim 11 are provided.

Specific embodiments of the invention are laid down in the dependent claims.

BRIEF DESCRIPTION OF THE DRAWINGS

In the following, the invention is further elucidated with reference to the schematic Figures in the accompanying drawing.

FIG. 3 shows a cross-section, in a plane III shown in FIG. 2a, of the holder of FIG. 2a;

FIG. 4 shows a front view, in perspective, of a portion of the holder shown in FIG. 2a;

DETAILED DESCRIPTION OF EXEMPLARY EMBODIMENTS

Figure 1A:
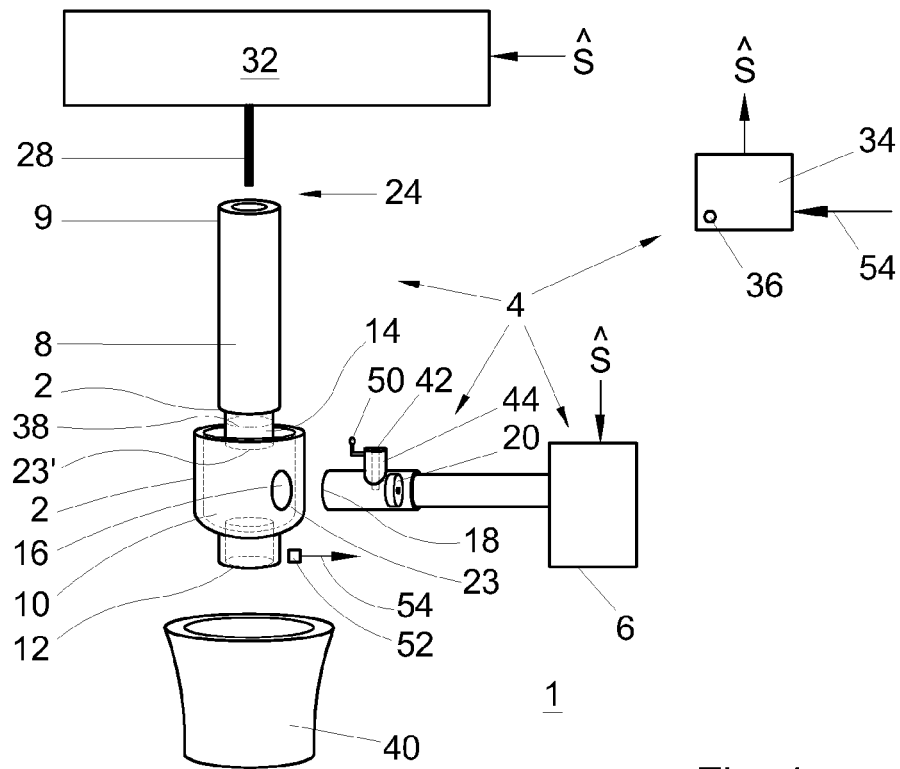
FIG. 1a shows an example of an embodiment of a system for preparing a predetermined amount of beverage suitable for consumption.
Figure 1B:
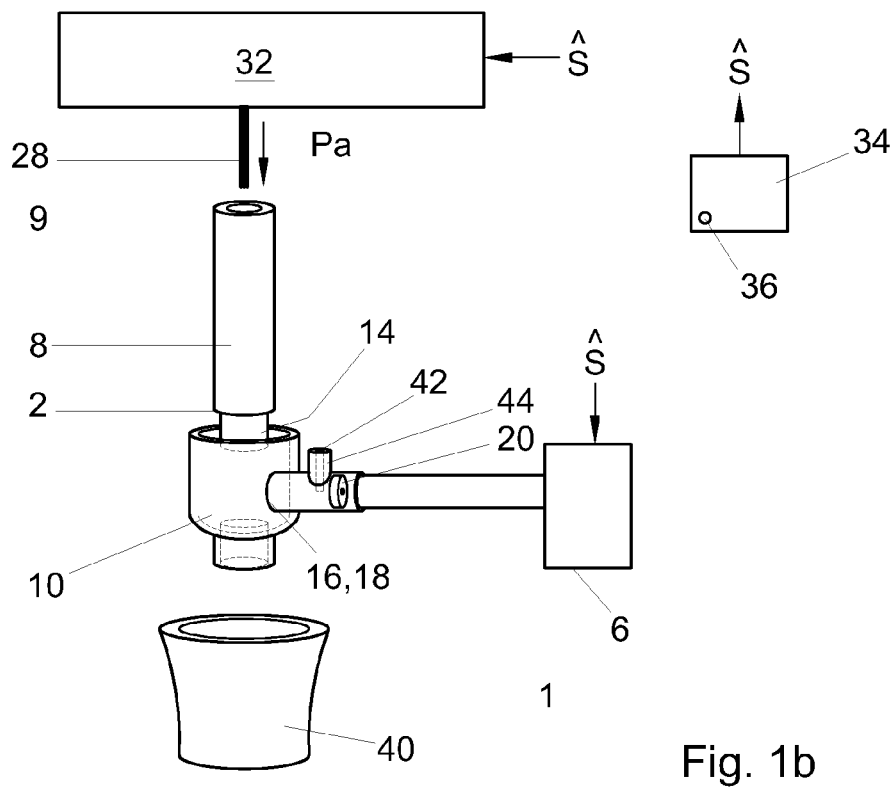
FIG. 1b shows the system of FIG. 1a in an operative condition.
Figure 1C:
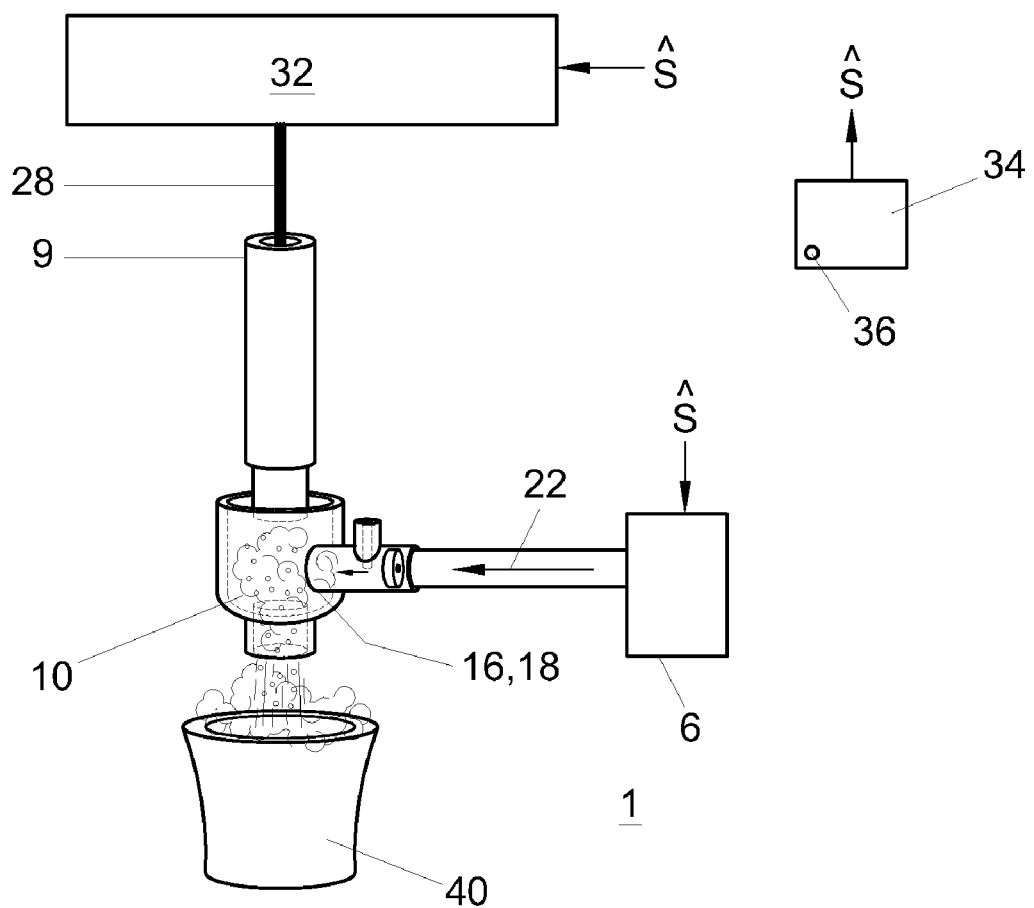
FIG. 1c shows the system of FIG. 1a in a different operative condition.

Reference is first made to FIGS. 1a-1c. In these Figures, with reference numeral 1, a system for preparing a predetermined amount of beverage suitable for consumption is indicated. The system (see FIG. 1a) is provided with an exchangeable holder 2.

It is noted that in FIGS. 1a-1c, for the purpose of the initial description of the system and its operation, the holder 2 is only represented in a highly schematic manner. A further description of the holder 2 will be given further on, with reference to FIGS. 2a, 2b and 3.

The system is further provided with an apparatus 4 which is provided with, inter alia, a fluid dispensing device 6 designed for dispensing, under pressure, at least an amount of at least a first fluid such as a liquid and/or a gas, more particularly such as water and/or vapour. In this example, in use, the fluid dispensing device 6 dispenses water.

The exchangeable holder 2 is provided with at least one storage space 8, which is filled with a second fluid such as a beverage, a concentrate or a powder. In this example, a concentrate for preparing coffee is involved. The holder 2 is further provided with at least a first mixing chamber 10 and at least one outflow opening 12, which is in fluid communication with the first mixing chamber 10. The holder 2 is further provided with a fluid communication 14 between the storage space 8 and the first mixing chamber 10.

The holder 2 is further provided with a fluid communication seal 38 for bringing the fluid communication 14 in operation through removal of the sealing action of the fluid communication seal 38. The fluid communication seal 38 which, in the FIGS. 1a-1c, for the purpose of the initial description of the system and its operation, has only been represented in a highly schematic manner, is formed by an at least locally weakened part of a sealing attachment between parts of the holder. A further description of the fluid communication seal will be given further on with reference of FIGS. 2a, 2b and 3.

The holder 2 is further provided with at least one inlet opening 16, which is detachably connected to an outlet opening 18 of the fluid dispensing device 6. In FIG. 1a, the inlet opening 16 has not yet been connected to the outlet opening 18. This is however the case in FIG. 1b. In this example, the inlet opening 16 in FIG. 1a is still closed off by a closure that can be removed, such as a removable seal. This also holds for the outflow opening 12. In use, both removable seals are removed whereupon the outlet opening 18 can be connected to the inlet opening 16 as shown in FIG. 1b.

In this example, the system is further provided with a restriction 20 which is included in a fluid flow path 21 which extends, via the outlet opening 18 of the fluid dispensing device 6, the inlet opening 16 and the first mixing chamber 10, from the fluid dispensing device 6 to the outflow opening 12.

More particularly, it holds in this example that the restriction 20 is included in a fluid flow path 22 which extends, via the outlet opening 18 of the fluid dispensing device 6 and the inlet opening 16 of the exchangeable holder 2, from the fluid dispensing device 6 to the first mixing chamber 10.

The storage space 8 forms at least a part of a dosing device 24 as will further be set forth hereinafter. In this example, this dosing device 24 is further provided with a needle 24 which, in use, is pierced through a wall of the storage space 8 for supplying a third fluid to the second fluid in the storage space 8 for dispensing the second fluid in a dosed manner to the first mixing chamber 10. In this example, the dosing device 24 is further provided with a fluid dispensing unit 32 which is connected to the needle 28. The fluid dispensing unit 32 and the needle 28 form part of the apparatus 4. In this example, the fluid dispensing unit 32 is detachably connected, at least via the needle 28, to the holder 2.

The apparatus 4 is further also provided with a control device 34 for controlling the fluid dispensing device 6 and the fluid dispensing device 32. To control the fluid dispensing device 6 and the fluid dispensing unit 32, the control device 34 generates control signals $\bar{s}$ which are supplied to the fluid dispensing device 6 and the fluid dispensing unit 32. In this example, the control device 34 is designed for controlling the fluid dispensing device 6 and the fluid dispensing unit 32 independently of each other.

The system 1 described heretofore works as follows. For the purpose of preparing a predetermined amount of beverage suitable for consumption, the exchangeable holder 2 is placed in the apparatus 4. Here, the storage space 8 of the exchangeable holder 2 is placed below the needle 28. Also, as shown in FIG. 1b, the outlet opening 18 is connected to the inlet opening 16. The apparatus is now ready for use.

By pushing, for instance, a button 36 of the control device 34, the control device provides for the fluid dispensing device 32 to move the needle 28 in the direction of the arrow Pa. The result thereof is that the needle 28 is pierced through a wall of the storage space 8 and the third fluid is supplied under pressure to the second fluid in the storage space. Consequently, the third fluid will apply a pressure and/or force to the second fluid. Hence, in this example, the pressure in the storage space 8 will increase. The second fluid is therefore pressurized with the pressure of the third fluid. As a result of the increase of the pressure in the storage space 8, the sealing action of the fluid communication seal 38 is removed so that the fluid communication 14 is brought into operation. As a result, in this example, the coffee concentrate will flow in a dosed manner from the storage space 8, via the fluid communication 14 to the first mixing chamber 10.

Simultaneously, the control device 34 ensures that the fluid dispensing device 6 is activated. This results in that the fluid dispensing device 6 starts dispensing the first fluid under pressure, in this example water. In this example, this water is hot water with a temperature of, for instance, 80-98° C. This hot water flows via the fluid flow path 22 to the restriction 20. Having arrived at the restriction 20, a jet of the hot water is generated by means of the restriction 20. This jet spouts via the outlet opening 18 and the inlet opening 16 into the first mixing chamber 10. It will be clear that in the example of FIGS. 1a and 1b, the first mixing chamber 10 comprises a first entrance opening 23 and a second entrance opening 23' placed at a distance from the first entrance opening while, in use, the first fluid enters the first mixing chamber via the first entrance opening and the second fluid enters the first mixing chamber via the second entrance opening.

In the first mixing chamber 10, the hot water will start mixing well with the concentrate. Here, the flow rate at which the concentrate is supplied to the first mixing chamber 10 is regulated by the control device 34, through control of the fluid dispensing unit 32. The flow rate at which the hot water is supplied to the first mixing chamber 10 is further also regulated by the control device 34 through control of the fluid dispensing device 6. In the first mixing chamber, as a result of the jet, the concentrate will mix well with the hot water, so that the beverage is formed. This beverage can then leave the outflow opening 12 and be captured in, for instance, a cup 40.

As, with the system 1, both the dosing of the concentrate over time and the dosing of the hot water over time can be regulated well, it can be ensured that the concentration of the amount of concentrate in the beverage can be accurately determined. Furthermore, it can be ensured that the beverage which, during its preparation, leaves the outflow opening 12, is of constant quality, that is, the concentration of the concentrate in the beverage that is dispensed can be kept constant during dispensing, if desired. The fact is that in this example, the flow rate of the water and the flow rate of the concentrate supplied to the first mixing chamber 10 can each, if desired, be controlled independently of each other. Therefore, it holds in this example, that the system 1 is designed such that the fluid dispensing device 6 and the dosing device 24 can supply, independently of each other, the first fluid and the second fluid, respectively, to the first mixing chamber. This entails that the size of the flow rate of the first fluid and the period during which the first fluid is dispensed are independent (in this example through control of the control device) of the size of the flow rate of the second fluid and the period during which the second flow rate is dispensed.

It further holds in this example, that the dosing device 24 is a controllable and active dosing device for supplying the second fluid to the first mixing chamber by applying an increased pressure or force to the second fluid. Herein, an active dosing device is understood to mean that the second fluid flows through the fluid communication from the storage space to the first mixing chamber as a result of an excess pressure or force applied on the side of the storage space.

In the example, the system 1 is further provided with an air inlet opening 42. The air inlet opening 42 ensures that air is supplied to the first mixing chamber 10 so that, in use, air is whipped into the beverage for obtaining a beverage with a fine-bubble froth layer. Thus, a café crème can be obtained. In this example, the air inlet opening 42 is in fluid communication with the first mixing chamber 10 downstream of the restriction 20. In this example, the air inlet opening 42 terminates, via a fluid communication 44, into the fluid flow path 22. In this example it therefore holds, that the air inlet opening and the restriction 20 each form part of the apparatus 4. However, this is not necessary. It will be clear that the air inlet opening 42 and/or the restriction 20 can form part of the exchangeable holder 2.

After the beverage, in this example coffee with a fine-bubble froth layer, has been prepared, the control device 34 stops the fluid dispensing device 6. The control device 34 also ensures that the third fluid is no longer supplied to the second fluid in the storage space, and that the needle 28 is retracted from the respective wall of the storage space 8, i.e., in a direction opposite that of the arrow Pa. Here, it may be such that the control device 34 first provides that the dispensing of the second fluid to the first mixing chamber is stopped and that after that, the supply of the first fluid (in this example, water) is stopped. Thus, the risk of the second fluid contaminating, for instance, the restriction 20 is reduced.

FIG. 1c shows a situation where the needle 28 is pierced through a wall of the storage space 8 and the third fluid is supplied under pressure to the second fluid in the storage space 8. The situation shown occurs at the moment at which the control device 34 will stop the supply of hot water to the first mixing chamber 10, will no longer effect the supply of the third fluid to the second fluid in the storage space 8, and will effect the retraction of the needle 28 from the respective wall of the storage space 8 so that, thereupon, the holder 2 can be taken from the apparatus 4 again.

After this, a user can remove the exchangeable holder 2 and, if a new amount of beverage is to be prepared, place a new exchangeable holder in the apparatus 4. The new exchangeable holder can be provided with an entirely different type of second fluid such as, for instance, a milk concentrate. When, with the aid of the new exchangeable holder, milk is prepared in a manner comparable to that as described for the preparation of coffee based on coffee concentrate, in the prepared milk, no trace will be found of the previously prepared type of beverage. The fact is that the first mixing chamber 10 forms part of the exchangeable holder and when a new exchangeable holder is placed in the apparatus 4, also, an entirely new and, hence, clean first mixing chamber is placed in the holder. Therefore, contamination cannot be involved.

In the example of FIGS. 1a-1c, the dosing device 24 is designed for supplying the third fluid under pressure to the second fluid in the storage space 8 for dispensing the second fluid in a dosed manner to the first mixing chamber 10. It will be clear that in addition or as an alternative, the dosing device 24 can be provided with a compressing unit for compressing the storage space 8 for dispensing the second fluid to the first mixing chamber in a dosed manner, as described in, for instance, WO 2006/04380.

In the example of FIGS. 1a-1c, the jet of the first fluid spouts into the first mixing chamber 10. It is possible that here, the jet impacts on an inside wall of the first mixing chamber 10, while swirls are formed in the first mixing chamber 10, resulting in that the concentrate, the first fluid and, optionally, air are mixed together. It is also possible that the jet impacts on a jet impact element in the first mixing chamber 10. Upon impact of the jet on the jet impact element, the liquid is atomized, so that air can be whipped in well.

As indicated above, for the purpose of the initial description of the system and its operation, the holder 2 is represented in the FIGS. 1a-1c in a highly schematic manner.

Figure 2A:
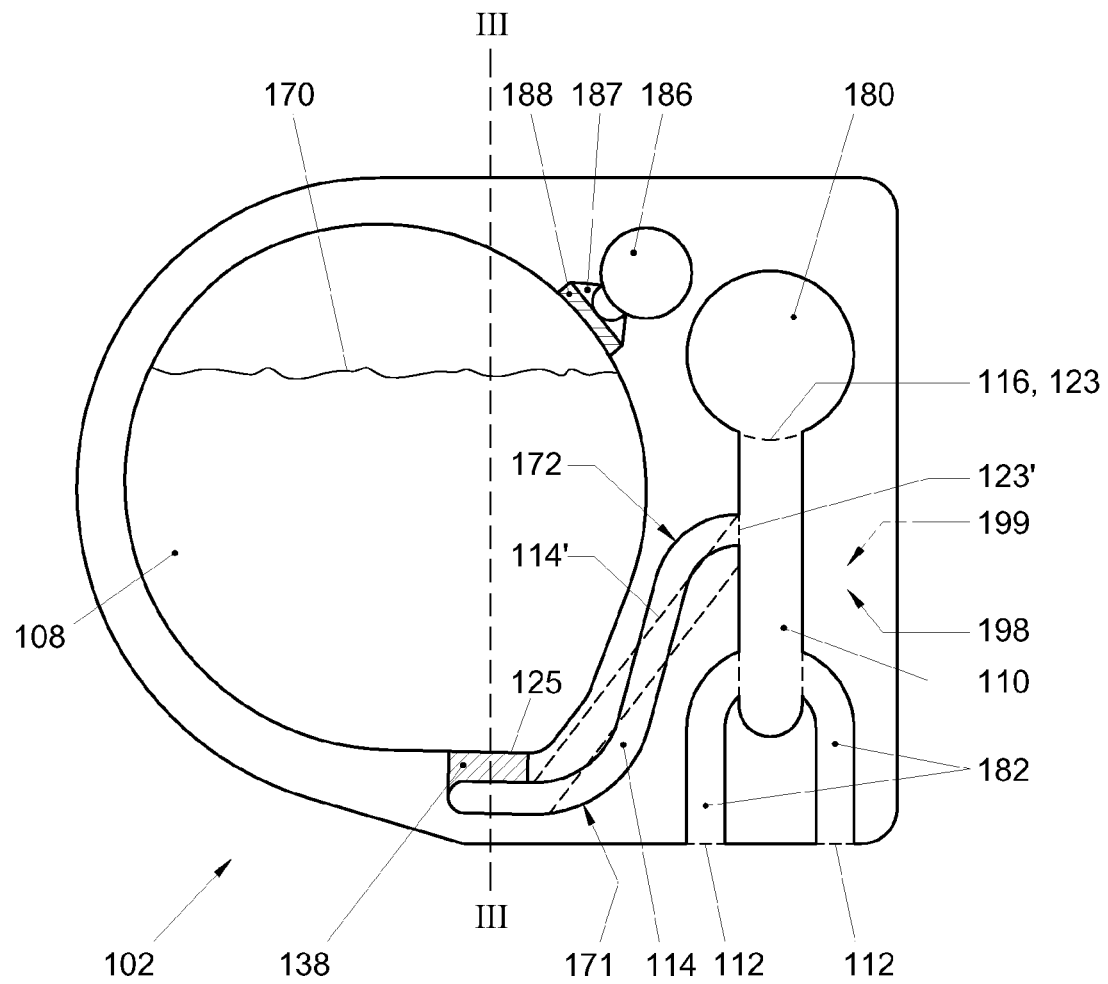
FIG. 2a shows an example of an embodiment of an exchangeable holder according to the invention.
Figure 3:
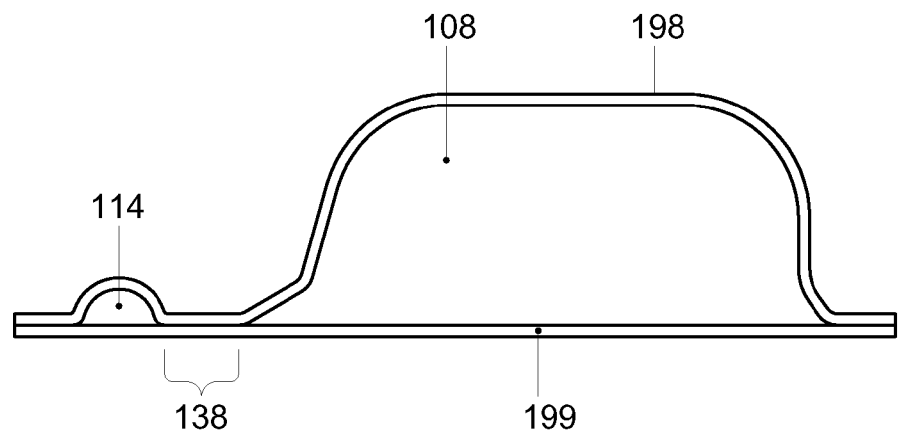

For the further description of the holder 2, presently, reference is first made to FIGS. 2a and 3 in which, by way of example, this holder for use in the system shown in FIGS. 1a-1c is shown in the form of a blister pack 102.

The holder 2, storage space 8, first mixing chamber 10, outflow opening 12, fluid communication 14, inlet opening 16, entrance opening 23, 23' and fluid communication seal 38 shown in FIGS. 1a-1c, are indicated in FIGS. 2a and 3 as the holder 102, the storage space 108, the first mixing chamber 110, the outflow opening 112, the fluid communication 114, the inlet opening 116, entrance openings 123, 123' and the fluid communication seal 138, respectively. It is noted that in the example shown, the blister pack 102 has two of such outflow openings 112.

In FIG. 2a, it can be seen that the first mixing chamber 110 is of elongated design and that a plane perpendicular to a longitudinal direction of the first mixing chamber, through a middle of the length of the first mixing chamber, intersects the first storage space 108. The first mixing chamber is therefore next to the first storage space. In FIG. 2a, it is further shown that the first storage space, viewed in projection on the covering, has a substantially round form.

The blister pack 102 is provided with blister chambers and a covering 199 of the blister chambers. FIG. 2a is a top plan view to the side of the blister pack where the material 198 is located from which the blister chambers have been formed, for instance deep-drawn. On the opposite side is situated the covering 199 of the blister chambers. The storage space 108, the first mixing chamber 110 and the fluid communication 114 between the storage space 108 and the first mixing chamber 110 are each formed by one of the blister chambers. In this example, the first mixing chamber 110 is connected to the two outflow openings 112 via two outflow channels 182 formed by further blister chambers of the blister pack.

The blister pack 102 is further provided with the fluid communication seal 138 for bringing the fluid communication 114 into operation through removal of the sealing action of the fluid communication seal 138. In the example shown, the fluid communication seal 138 is a peel seal 138, i.e., a locally weakened part of the sealing attachment between, on the one side, the material 198 from which the blister chambers have been deep-drawn, and, on the other side, the material of the covering 199 of the blister chambers.

In this example therefore, the material 198 from which the blister chambers have been formed consists of one curved face. It is possible that the exchangeable holder consists of the blister chambers of the first material 198, the covering connected thereto, and one or more ingredients, such as the second fluid, for the beverage to be prepared. Thus is provided the exchangeable holder with the particularly simple structure.

In FIG. 2a, it can be seen that the first mixing chamber 110 is of elongated design and that a plane perpendicular to a longitudinal direction of the first mixing chamber, through a middle of the length of the first mixing chamber, intersects the first storage space 108. The first mixing chamber is therefore next to the first storage space. In FIG. 2a, it is further shown that the first storage space 108, viewed in projection on the covering 199, has a substantially round form.

The fluid communication 114 is a channel which is not straight in longitudinal direction of the channel. It is for instance shown in FIG. 2a that, in the longitudinal direction of the channel, the fluid communication 114 has a first curvature 171 in a plane parallel to the covering 199. In the example of FIG. 2a, the first storage space 108 is provided with an exit opening 125 next to, in use, the vertically lowest point of the first storage space. The channel 114 springs from the exit opening 125. In FIG. 2a, the exit opening 125 is located at a vertically lower point than the second entrance opening 123'.

In the example of FIG. 2a, it is shown that the channel 14 extends along a path that is longer than a shortest connection between the exit opening 125 and the second entrance opening 123'. In FIG. 2a, the shortest connection is represented in uninterrupted lines and indicated with reference numeral 114'. The curvature of the channel 114 thus contributes to the realisation of a greater channel length and therefore greater flow resistance, without detracting from the compact shape of the holder.

The blister pack 102 is further provided with a chamber 180 which is in communication, via the inlet opening 116, with the first mixing chamber 110. Via this chamber 180, the outlet opening 18 of the fluid dispensing device 6 can be connected to the inlet opening 116.

Figure 4:
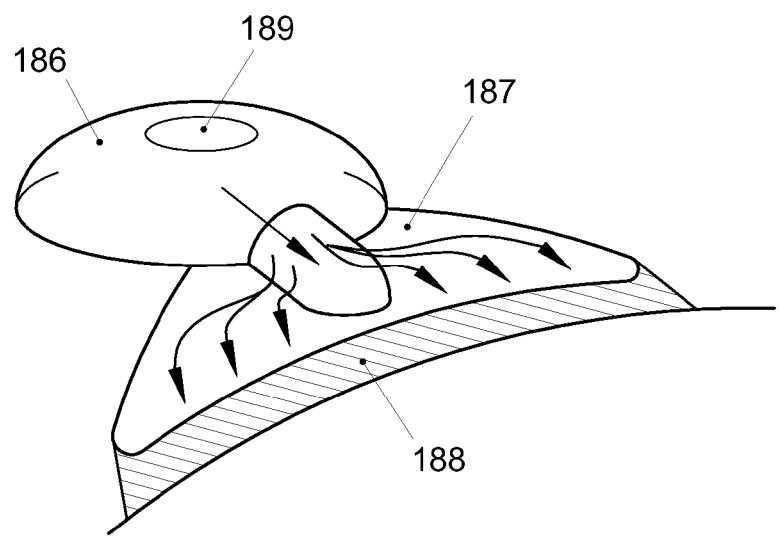

The blister pack 102 is further provided with a blister chamber 186, which is also shown in FIG. 4. This blister chamber communicates, via a zone 187 in which the material 198 from which the blister chambers have been deep-drawn is not attached to the covering 199, with a peel seal 188 which is, for instance, similar to the above-mentioned peel seal 138. The peal seal 188 adjoins the storage space 108. The needle 28 (see FIG. 1) of the dosing device 24 can be pierced through a wall portion 189 (see FIG. 4) of the chamber 186. However, it is also possible that the needle 28 is pierced through the covering 199 in the chamber 186. In this manner, the third fluid can be supplied to the chamber 186, whereupon the third fluid can be supplied under pressure via the zone 187 and the peel seal 188 to the storage space 108. With the aid of arrows, in FIG. 4, the flow direction of the third fluid is indicated. In this example, with the aid of the zone 187, a relatively great effective surface of the peel seal 188 is obtained, upon which surface the pressure of the third fluid can act for opening the peel seal 188.

Figure 5:
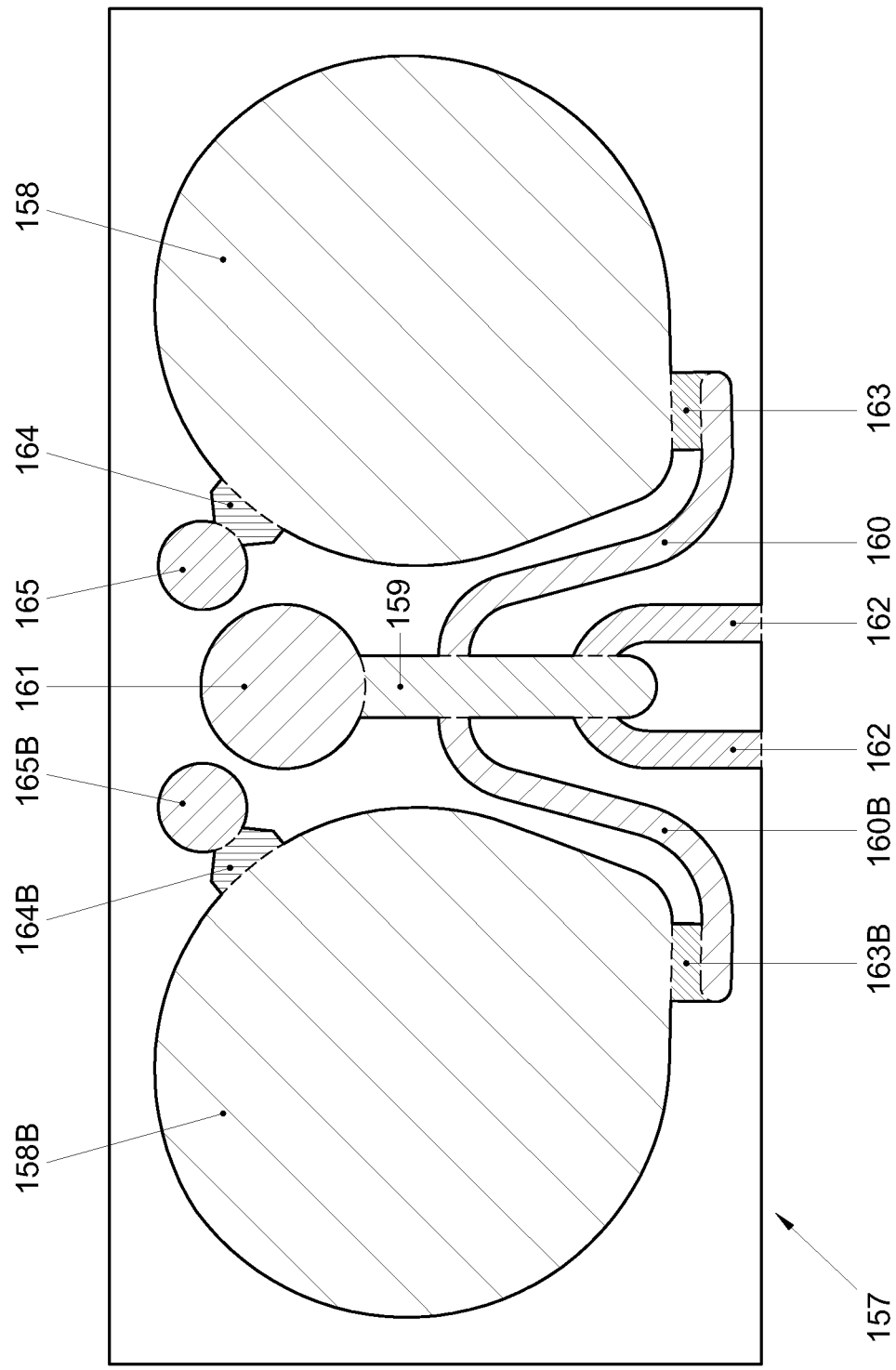
FIG. 5 shows a front view of a holder receiving portion of an apparatus of a system according to the invention.

Reference is now made to FIG. 5. In FIG. 5 is shown a holder receiving portion 157 of the apparatus 4. The holder receiving portion 157 is designed for detachably receiving the holder 102 for preparing a beverage suitable for consumption. The holder receiving portion 157 is provided with holder receiving recesses for receiving blister chambers of the holder 102. For instance, a first holder receiving recess 158 is designed for receiving the blister chamber of the storage space 108, a second holder receiving recess 159 for receiving the blister chamber of the first mixing chamber 110, and a third holder receiving recess 160 for receiving the blister chamber of the fluid communication 114. Viewed in cross-sections through a plane parallel to the covering 199 of the holder 102 received in the holder receiving portion 157, these holder receiving recesses 158, 159, 160 have contours that correspond, at least partly, to contours of the blister chambers of the storage space 108, the first mixing chamber 110 and the fluid communication 114.

The holder receiving portion 157 is further provided with further recesses, i.e. a recess 161 for receiving the chamber 180, two recesses 162 for receiving the outflow channels 182, a recess 163 for receiving the peel seal 138 and having it detach under pressure, a recess 164 for receiving the zone 187 and the peel seal 188 and having them detach under pressure, and a recess 165 for receiving the blister chamber 186.

It is noted that in FIG. 5, a recess is less deep according as hatching lines indicated in this recess lie closer together. For instance, in the example of FIG. 5, the first holder receiving recess 158 (intended for the storage space 108) is deeper than the second holder receiving recess 159 (intended for the first mixing chamber 110), which, in turn, is deeper than the third holder receiving recess 160 (intended for the fluid communication 114). However, other mutual depth proportions for the different recesses are also possible. It is further noted that the view shown in FIG. 5 is a view in the direction of increasing depth of the recesses.

For preparing a beverage suitable for consumption, the holder 102 shown in FIG. 2a can be placed by a user in the holder receiving portion 157 of the apparatus 4 shown in FIG. 5. In placed condition, the holder 102 is situated substantially at the center part and right hand part of the holder receiving portion 157 shown in FIG. 5. Thus, the preparation of the beverage can take place as described hereinabove with reference to FIGS. 1a-1c.

In placed condition, the holder 102 is, in operation, preferably in a position such that the outflow opening(s) 112 are situated on a side of the first mixing chamber 110 facing downwards. Here, the holder 102 can, for instance, be placed such that the covering 199 of the blister pack 102 is placed vertically. When placing in the holder receiving portion 157, the blister pack 102 may still be placed with the cover 199 of the blister pack 102 horizontally, and then, for bringing the system in the operative condition, the holder receiving portion 157 can be turned such that the blister pack 102 is placed vertically.

In FIG. 2a, reference numeral 170 indicates the level of the second fluid in the storage space 108 when the holder 102 is placed and is in operative condition. According as, in operation, more and more of the second fluid is supplied to the first mixing chamber, the level 170 drops more and more. In order to optimally empty the storage space 108, it is advantageous when, in operation, the location where the second fluid flows from the storage space 108 is situated as far downwards as possible. In the example shown, the peel seal 138 is therefore situated at a position as much downwards as possible relative to the storage space 108.

The above-mentioned correspondence of the contours of the holder receiving recesses and the contours of the blister chambers offers the advantage that in operation, the holder receiving portion 157 contributes to the walls of the blister chambers being held in place when pressure is applied to these walls. This being the case, it is advantageous when parts of the contours of the holder receiving recess 160 of the holder receiving portion 157 correspond at least partly to parts of the contours of the first curvature 171 of the fluid communication 114 such, that the holder receiving recess 160 has a portion proceeding according to the first curvature 171, for receiving the first curvature 171 of the fluid communication 114.

Figure 2B:
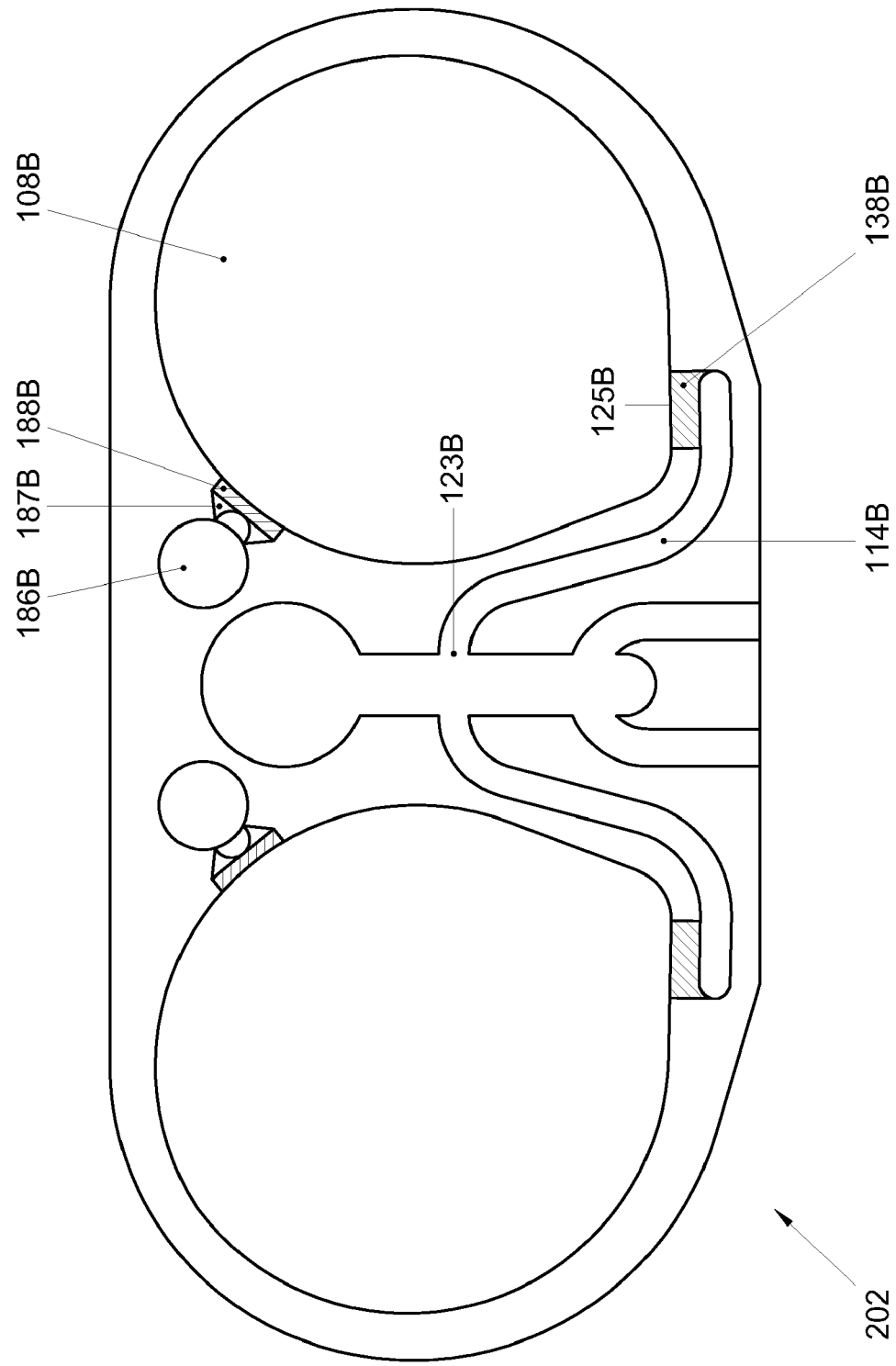
FIG. 2b shows an example of a different embodiment of an exchangeable holder according to the invention.
Figure 2C:
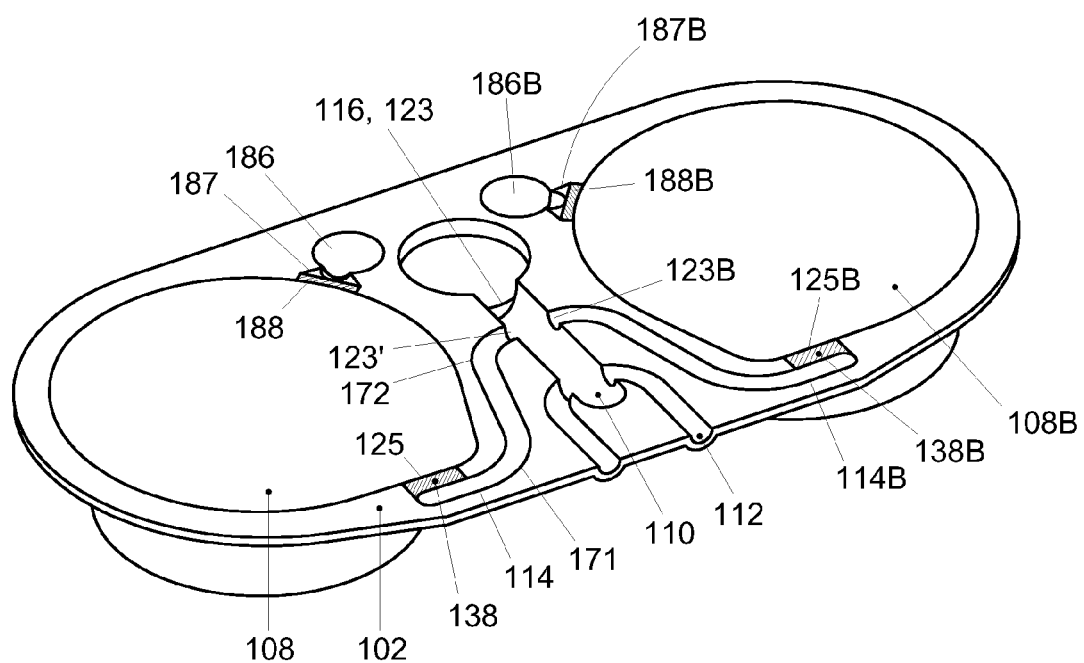
FIG. 2c shows a view, in perspective, of the exchangeable holder shown in FIG. 2b.

Presently, reference is made to FIGS. 2b and 2c, in which a holder 202 is shown. The difference between the holder 102 and 202 is that the holder 202 comprises a second storage space 108B, similar to the storage space 108, and a second fluid communication 114B, similar to the fluid communication 114. In the two storage spaces 108 and 108B, mutually different second fluids may be stored, for instance a coffee concentrate in one, and a milk concentrate in the other. The holder 202 also comprises a second chamber 186B, a second zone 187B, a second peel seal 188B, a third entrance opening 123B, a second exit opening 125B and a second peel seal 138B, each similar to the chamber 186, the zone 187, the peel seal 188, the entrance opening 123', the exit opening 125, and the peel seal 138, respectively. It is noted that in FIG. 2b, for the sake of clarity, the reference numerals indicated in FIG. 2a are not included again.

The holder 202 having the two storage spaces 108 and 108B can be used in a system which is provided with a dosing device which is designed for dispensing the second fluids in a dosed manner to the first mixing chamber from the two different storage spaces. With respect to the example shown in FIG. 1, the dosing device can comprise, to that end, in addition to the needle 28, for instance a second needle, while the second needle can then be introduced into the second chamber 186B.

For preparing a beverage suitable for consumption, also, the holder 202 can be placed on the holder receiving portion 157 of the apparatus 4 shown in FIG. 5. The holder receiving portion 157 shown in FIG. 5 is therefore suitable for the holder 102 shown in FIG. 2a, as well as for the holder 202 shown in FIG. 2b.

Preferably, the two storage spaces 108 and 108B are situated on opposite sides of the first mixing chamber 110 and, also, two fluid communications 114 and 114B are situated on opposite sides of the first mixing chamber 110, as is the case in the example shown in FIGS. 2b and 2c. In this manner, the compactness of the holder 202 is realized, while then, the associated holder 102 having only one storage space 108 but still fitting in the same holder receiving portion 157, is also compact.

As stated, the fluid communication 114 is a channel having, in longitudinal direction of the channel, a first curvature 171 in a plane parallel to the covering 199. It is further advantageous when the channel has a second curvature in this longitudinal direction in the plane mentioned, indicated with reference numeral 172 in FIG. 2, which second curvature, in this example, is the opposite of the first curvature so that the channel has a S-shaped portion. The second curvature 172 contributes to a further extent to the above-mentioned effects that are also achieved with the first curvature 171, i.e., contributing to an increased flow resistance of the channel. In addition, with the aid of the second curvature 172, the fluid communication 114 can be designed such that a favourable inflow of the second fluid into the first mixing chamber 110 is realized. Thus, it can for instance be ensured, with the aid of the second curvature 172, that the fluid communication 114 links up at a more or less locally right angle to the first mixing chamber 110, so that the second fluid, upon entering the first mixing chamber 110, on the one side, does not tend too much towards the direction of the inlet opening, and, on the other side, does not tend too much towards the outflow openings 112.

It is further advantageous when parts of the contours of the holder receiving recess 160 of the holder receiving portion 157 correspond at least partly to parts of the contours of the second curvature 172 of the fluid communication 114 such that the holder receiving recess 160 has a portion proceeding in an S-shape for receiving the first curvature 171 and the second curvature 172 of the fluid communication 114. This offers the advantage that, in operation, the holder receiving portion 157 contributes to holding the walls of the S-shaped portion of the channel 114 in place when pressure is applied to those walls.

In order to avoid that the second fluid does not obtain sufficient opportunity to mix with the first fluid in the first mixing chamber 110, it is advantageous that the location where the fluid communication 114 links up with the first mixing chamber is not too close to the location where the outflow channels 182 link up with the first mixing chamber 110. When the first mixing chamber 110 is provided with an air inlet opening for supplying air to the first mixing chamber, so that, in use, air is whipped into the beverage for obtaining a beverage with a fine-bubbled froth layer, it is advantageous that the location where the fluid communication 114 links up with the first mixing chamber is not too close to the air inlet opening, as otherwise, a favourable supply of air can be disturbed. Through the use of the first curvature 171 and the second curvature 172, for these and other reasons, desired connections of the fluid communication 114 to the first mixing chamber 110 can be realized.

It is advantageous when the cross-section of a fluid communication is not too large and the length of a fluid communication is not too small. It is preferred that the maximum cross-section of a fluid communication varies from, for instance, 1 to 3 mm, more particularly from 1.5 to 2.5 mm. Preferably, the length of a fluid communication varies from, for instance, 2 to 5 cm, more particularly from 3 to 4 cm. Such cross-sections that are not too large and lengths that are not too short of a fluid communication, prevent the storage space from emptying undesirably rapidly when the second fluid is, for instance, a low viscous product. What can be achieved with such cross-sections that are not too great and lengths that are not too short of a fluid communication is, that a fluid communication of a particular size is suitable for use in different holders containing different sorts of second fluids. Here, for such a fluid communication of a specific size, a matching holder receiving recess 160 of the holder receiving portion 157 can be used, so that the holder receiving recess 160 is also suitable for different holders with different sorts of second fluids.

The invention is not limited in any manner to the embodiments outlined hereinabove. For instance, an exchangeable holder can comprise, instead of one or two storage spaces for second fluids, also, more than two storage spaces for second fluids. In the more than two storage spaces, the mutually different second fluids can be stored. As a consequence, instead of one or two fluid communications, the holder can comprise, also, more than two fluid communications. The second fluids may be mixable with and/or soluble in the first fluid. In the example, the storage spaces were filled with coffee concentrate and/or milk concentrate. Other fluids, based or not based on concentrate are also conceivable, here, for instance a squash or powder for preparing a lemonade can be considered. The apparatus may further be provided with additional storage spaces that may be filled with additives such as, for instance, soluble powders or concentrates. These powders too may be supplied to the first mixing chamber by, for instance, forcing out through a third fluid, or by emptying the respective storage space through squeezing. Here, for instance, flavour enhancers, sugars, cocoa and the like can be involved. Also, milk powder and/or milk creamer can be considered. Generally, it holds that, apart from a liquid such as a concentrate, the second fluid can also be a powder and the like, soluble in the first fluid or mixable with the first fluid, for instance soluble in a liquid such as water. A second fluid in the storage space can also comprise both a concentrate and a powder, in mixed form or not in mixed form.

Instead of or in addition to the described blister pack, the holder can further comprise a different type of package. Such a different package may be provided with package chambers while at least the storage space, the first mixing chamber and the fluid communication are each formed by one of the package chambers, and wherein also the fluid communication seal forms part of the other package. The package chambers can then be formed by, for instance, two package parts of the package sealingly attached to each other, with each package part already comprising parts of the package chambers. In the first package part for instance, a first half of a storage space may be formed while in the second package part a second half of the storage space is formed, the two package halves being sealingly attached to each other halfway the complete storage space to be formed. The fluid communication seal can then be formed by a locally weakened part of this latter sealing attachment.

The holder can further also comprise an assembly of separate, similar packages, for instance an assembly of separate blister packs, an assembly of separate packages of a different type, or an assembly of one or more blister packs with one or more packages of a different type. Optionally, parts of such an assembly can be designed so as to be separable, for instance tearable, so that users may remove part of the holder when they wish to prepare, for instance, a cup of coffee without milk.

It is also not necessary that the fluid communication seal is located on or adjacent the transition of a storage space to the fluid communication. The fluid communication seal can, for instance, also be located on or adjacent the transition of the fluid communication to the first mixing chamber, or, for instance be an interruption of the channel of the fluid communication.

Such variants are all understood to fall within the framework of the invention. The temperature of the first fluid can vary. The first fluid can for instance also consist of water at room temperature, or cold water. The temperature of the first fluid which is supplied to the holder for preparing a beverage can also vary over time.

The volume of a storage space can for instance vary from 5 to 150 ml, more particularly from 6 to 50 ml. A passage opening of the restriction can for instance vary from 0.4 to 1.5 mm, more particularly from 0.6 to 1.3 mm, still more particularly from 0.7 to 0.9 mm. The pressure at which, in use, the liquid dispensing device dispenses the first fluid can vary from 0.6 to 12 bar, more particularly from 0.7 to 2 bar, preferably from 0.9 to 1.5 bar. The period during which the first fluid is supplied to the first mixing chamber for preparing the beverage can vary from 2 to 90 seconds, more particularly from 10 to 50 seconds. The size of the air inlet opening, when this is fully opened, can vary from, for instance, 0.005 to 0.5 $mm^2$.

The invention claimed is:

1. An exchangeable holder designed to be connected to an apparatus provided with a fluid dispensing device for dispensing at least a first fluid, such as a gas and/or liquid, under pressure to the exchangeable holder for preparing a beverage suitable for consumption, the exchangeable holder comprises:
   at least a first storage space which is filled with a second fluid such as a concentrate,
   at least a first mixing chamber,
   at least one outflow opening which is in fluid communication with the first mixing chamber for dispensing the beverage from the first mixing chamber,
   at least a first fluid communication between the storage space and the first mixing chamber for dispensing the second fluid to the first mixing chamber, and
   at least one inlet opening which, in use, is detachably connected to an outlet opening of the fluid dispensing device for supplying the first fluid to the first mixing chamber, the first storage space forming part, at least partly, of a dosing device which is designed for supplying the second fluid in a dosed manner from the first storage space to the first mixing chamber, while in use, also, the first fluid is supplied, under pressure, to the first mixing chamber so that the second fluid and the first fluid mix together for obtaining the beverage which then leaves the holder via the outflow opening;
   at least one fluid communication seal for bringing the first fluid communication into operation through removal of the sealing action of the fluid communication seal, while the fluid communication seal is formed by a locally weakened part of a sealing attachment between parts of the holder;
   wherein the first fluid communication is a channel having a first curvature in longitudinal direction of the channel.

2. A holder according to claim 1, wherein the channels extends along a path that is longer than a shortest connection between the first mixing chamber and the first storage space.

3. A holder according to claim 1, wherein the holder is designed such that, in use, a third fluid can be supplied by the apparatus, in a controlled manner, under pressure, to the second fluid in the first storage space for supplying the second fluid in said dosed manner from the first storage space to the first mixing chamber.

4. A holder according to claim 3, wherein the holder is designed such that, in use, the second fluid can be supplied in a dosed manner from the first storage space to the first mixing chamber by means of pressurizing the second fluid with the pressure of the third fluid.

5. A holder according to claim 1, wherein the first storage space is at least partly bounded by a wall of a flexible or deformable material such as a foil, so that the first storage space can be compressed for supplying the second fluid in said dosed manner from the first storage space to the first mixing chamber.

6. A holder according to claim 1, wherein the holder comprises a blister pack which is provided with blister chambers; a covering of the blister chambers, the first storage space and/or the first mixing chamber and/or the first fluid communication between the first storage space and the first mixing chamber each being formed by one of the blister chambers; while the first curvature occurs in a plane parallel to the covering.

7. A holder according to claim 6, wherein the holder further comprises at least one fluid communication seal for bringing the first fluid communication into operation through removal of the sealing action of the fluid communication seal, while preferably, the fluid communication seal is formed by a locally weakened part of a sealing attachment between parts of the holder, and wherein the locally weakened part of the sealing attachment is used between, on the one side, material from which the blister chambers have been formed, for instance deep-drawn, and, on the other side, material of the covering of the blister chambers.

8. A holder according to claim 6, wherein the first storage space, viewed in projection on the covering, has a substantially round form.

9. A holder according to claim 1, wherein the first mixing chamber is of elongated design and a plane perpendicular to a longitudinal direction of the first mixing chamber and through the middle of the length of the first mixing chamber intersects the first mixing chamber.

10. A holder according to claim 9, wherein the first mixing chamber comprises a first entrance opening and a second entrance opening placed at a distance from the first entrance opening while, in use, the first fluid enters the first mixing chamber via the first entrance opening and wherein the channel terminates into the second entrance opening of the first mixing chamber.

11. A holder according to claim 10, wherein the second entrance opening is located near the middle of the longitudinal direction of the first mixing chamber, in use preferably vertically higher than the middle.

12. A holder according to claim 11, wherein the first storage space is provided with an exit opening near, in use, a vertically lowest point of the first storage space, with the channel terminating into the exit opening.

13. A holder according to claim 12, wherein the channel extends along a path which is longer than a shortest connection between the exit opening and the second entrance opening.

14. A holder according to claim 12, wherein, in use, the exit opening is located at a vertically lower point than the second entrance opening.

15. A holder according to claim 1, wherein the channel has a second curvature in said longitudinal direction, which second curvature is opposite of the first curvature so that the channel has an S-shaped portion.

16. A holder according to claim 1, wherein the holder is further provided with a second storage space which is filled with a fourth fluid, such as a concentrate, and a second fluid communication between the second storage space and the first mixing chamber for dispensing the fourth fluid to the first mixing chamber, while, the second fluid communication is a channel having a third curvature in longitudinal direction of the second channel.

17. A holder according to claim 16, wherein the first mixing chamber is located between the first and the second storage spaces.

18. A holder according to claim 1, wherein the holder is provided with two storage spaces located on opposite sides of the first mixing chamber, which are each filled with a second fluid, and with two fluid communications located on opposite sides of the first mixing chamber, which each form a fluid communication between one of the storage spaces and the first mixing chamber.

19. A holder according to claim 16, wherein the holder is designed such that, in use, a fifth fluid can be supplied, by the apparatus, in a controllable manner, under pressure, to the fourth fluid in the second storage space for dispensing the fourth fluid in a dosed manner from the second storage space to the first mixing chamber while, in use, also the first fluid is supplied under pressure to the first mixing chamber so that the fourth fluid, and, optionally, the second fluid on the one side, and the first fluid on the other side, mix together for obtaining the beverage which then flows from the holder via the outflow opening.

20. A holder according to claim 19, wherein the holder is designed such that, in use, the fourth fluid can be supplied in a dosed manner from the second storage space to the first mixing chamber by means of pressurizing the fourth fluid with the pressure of the fifth fluid.

21. A system for preparing a predetermined amount of beverage suitable for consumption, the system comprising:
   an exchangeable holder, and an apparatus provided with a fluid dispensing device which is detachably connected to the holder for dispensing, under pressure, at least an amount of a first fluid such as a liquid and/or a gas, in particular such as water and/or steam, to the exchangeable holder, wherein the exchangeable holder includes:
      at least first storage space which is filled with a second fluid such as a concentrate,
      at least a first mixing chamber,
      at least one outflow opening which is in fluid communication with the first mixing chamber for dispensing the beverage from the first mixing chamber,
      at least a first fluid communication between the first storage space and the first mixing chamber for dispensing the second fluid to the first mixing chamber, and
      at least one inlet opening which is detachably connected to an outlet opening of the fluid dispensing device for supplying the first fluid to the first mixing chamber,
   a dosing device which is designed for dispensing the second fluid in a dosed manner from the first storage space to the first mixing chamber, the fluid dispensing device being designed for supplying the first fluid under pressure to the first mixing chamber so that, in the first mixing chamber, the first fluid and the second fluid mix together for obtaining the beverage which then leaves the exchangeable holder via the outflow opening, wherein the first fluid communication is a channel having a first curvature in longitudinal direction of the channel; and
   at least one fluid communication seal for bringing the first fluid communication into operation through removal of the sealing action of the fluid communication seal, while the fluid communication seal is formed by a locally weakened part of a sealing attachment between parts of the holder.

22. A system according to claim 21, wherein the dosing device is designed for supplying the second fluid, in said dosed manner, from the first storage space to the first mixing chamber by means of supplying a third fluid, such as a gas or a liquid, in a controlled manner, under pressure, to the second fluid in the first storage space.

23. A system according to claim 22, wherein the dosing device is designed for the dosed supply of the second fluid from the first storage space to the first mixing chamber by means of pressurizing the second fluid with the pressure of the third fluid.

24. A system according to claim 21, wherein the dosing device for said dosed supply of the second fluid from the first storage space to the first mixing chamber is provided with a compressing unit for compressing the storage space.

25. A system according to claim 21, wherein the holder comprises a blister pack which is provided with: blister chambers; a covering of the blister chambers, wherein the first storage space and/or the first mixing chamber and/or the fluid communication between the storage space and the first mixing chamber are each formed by one of the blister chambers; wherein the first curvature occurs in a plane parallel to the covering.

26. A system according to claim 21, wherein the holder comprises a blister pack which is provided with: blister chambers; a covering of the blister chambers, wherein the first storage space and/or the first mixing chamber and/or the fluid communication between the storage space and the first mixing chamber are each formed by one of the blister chambers; wherein the first curvature occurs in a plane parallel to the covering, and wherein the locally weakened part of the sealing attachment is used between, on the one side, material from which the blister chambers have been formed, for instance deep-drawn, and, on the other side, material of the covering of the blister chambers.

27. A system according to claim 25, wherein the first storage space, viewed in projection on the covering, has a substantially round form.

28. A system according to claim 21, wherein the first mixing chamber is of elongated design and a plane perpendicular to a longitudinal direction of the first mixing chamber and through a middle of the length of the first mixing chamber, intersects the first storage space.

29. A system according to claim 28, wherein the first mixing chamber comprises a first entrance opening and a second entrance opening placed at a distance from the first entrance opening, while, in use, the first fluid enters the first mixing chamber via the first entrance opening and wherein the channel terminates into the second entrance opening of the first mixing chamber.

30. A system according to claim 29, wherein the second entrance opening is located near the middle of the longitudinal direction of the first mixing chamber, in use preferably vertically higher than the middle.

31. A system according to claim 30, wherein the first storage space is provided with an entrance opening near, in use, a vertically lowest point of the first storage space, with the channel springing from the exit opening.

32. A system according to claim 31, wherein the channel extends along a path which is longer than a shortest connection between the exit opening and the second entrance opening.

33. A system according to claim 31, wherein, in use, the exit opening is located at a vertically lower point than the second entrance opening.

34. A system according to claim 21, wherein the holder is further provided with a second storage space which is filled with a fourth fluid, such as a concentrate, and a second fluid communication between the second storage space and the first mixing chamber for dispensing the fourth fluid to the first mixing chamber, while the second storage space forms part, at least partly, of the dosing device which further is designed for dosed supply of the fourth fluid from the second storage space to the first mixing chamber while, in use, the first fluid is also supplied under pressure to the first mixing chamber so that the second fluid and/or the fourth fluid on the one side, and the first fluid on the other side, mix together for obtaining the beverage which then leaves the holder via the outflow opening, while the second fluid communication is a second channel which has a third curvature in the longitudinal direction of the second channel.

35. A system according to claim 34, wherein the dosing device is designed for said dosed supply of the fourth fluid from the second storage space to the first mixing chamber by means of supplying a fifth fluid, such as a gas or a liquid, controllably, under pressure, to the fourth fluid in the second storage space.

36. A system according to claim 35, wherein the dosing device is designed for dosed supply of the fourth fluid from the second storage space to the first mixing chamber by means of pressurizing the fourth fluid with the pressure of the fifth fluid.

37. A system according to claim 21, wherein the system is provided with a holder receiving portion which is designed for detachably receiving the holder for preparing a beverage suitable for consumption, which holder receiving portion is provided with recesses for receiving at least the first storage space, optionally the second storage space, the first mixing chamber, the first fluid communication and, optionally, the second fluid communication, which recesses, viewed in a flat cross-section of the holder received in the holder receiving portion, have contours which correspond at least partly to contours of said first mixing chamber, the first storage space, the optionally second storage space, and the first fluid communication.

38. A system according to claim 37, wherein the contours of the holder receiving portion correspond to the contours of the first mixing chamber, the first storage space, the optionally second storage space and the first fluid communication.

39. An apparatus provided with a fluid dispensing device for dispensing at least a first fluid, such as a gas and/or liquid, under pressure to an exchangeable holder having at least a first storage space, a first mixing chamber, a first fluid communication between the first storage space and the first mixing chamber, a second storage space, and a second fluid communication between the second storage space and the first mixing chamber, the apparatus comprising:
 a holder receiving portion which is designed for detachably receiving the holder for preparing a beverage suitable for consumption, which holder receiving portion is provided with at least one holder receiving recess for receiving the first storage space and/or, optionally, the second storage space and/or the first mixing chamber and/or the first fluid communication and/or, optionally, the second fluid communication, which at least one holder receiving recess, viewed in a flat cross-section of the holder with the holder received in the holder receiving portion, has contours which correspond, at least partly, to contours of the first storage space and/or the optionally second storage space and/or the first mixing chamber and/or the first fluid communication and/or the optionally second fluid communication.

40. An apparatus according to claim 39, wherein parts of the contours of the at least one holder receiving recess of the holder receiving portion correspond at least partly to parts of the contours of the first curvature of the fluid communication such that the at least one holder receiving recess has a portion proceeding according to the first curvature for receiving the first curvature of the fluid communication.

41. An apparatus according to claim 40, wherein the first fluid communication is a channel having a first curvature in longitudinal direction of the channel and a second curvature in said longitudinal direction, which second curvature is opposite of the first curvature so that the channel has an S-shaped portion, wherein parts of the contours of the at least one holder receiving recess of the holder receiving portion correspond, at least partly, to parts of the contours of the second curvature of the fluid communication such that the at least one holder receiving recess has a portion proceeding in an S-shape for receiving the first curvature and the second curvature of the fluid communication.

* * * * *